United States Patent Office 3,554,753
Patented Jan. 12, 1971

3,554,753
HEXAARYLBIIMIDAZOLE-CARBOCYANINE DYE COMPOSITIONS
Robert L. Cohen, Wilmington, Del., assignor to E. I. du Pont de Nemours and Company, Wilmington, Del., a corporation of Delaware
No Drawing. Filed July 20, 1967, Ser. No. 654,676
Int. Cl. G03c 1/72
U.S. Cl. 96—90                                    19 Claims

ABSTRACT OF THE DISCLOSURE

Visible-light activated phototropic compositions of a hexaarylbiimidazole that normally requires ultraviolet light for activation and a carbocyanine dye that is a visible-light absorbing enery-transfer agent, and optionally, an oxidizable leuco form of a dye, preferably an aminotriarylmethane. A method for irradiating the composition with visible light in the 500–600 m$\mu$ range.

BACKGROUND OF THE INVENTION (1) Field of the invention

This invention concerns novel visible-light sensitive phototropic compositions comprising a hexaarylbiimidazole and a carbocyanine dye.

(2) Description of the prior are

Hexaarylbiimidazoles dissociate upon exposure to ultraviolet light to form stable colored triarylimidazolyl radicals as described in British Pat. 997,396, published July 7, 1965. Such dissociation is useful in hexaarylbiimidazole/leuco dye compositions, for the imidazolyl radical, formed as described above, oxidizes the leuco form of the dye to the colored form. Thus, colored images are obtained making the compositions useful in imaging applications, as described in British Pat. 1,047,569, published Nov. 9, 1966. That ultraviolet light is required to activate the biimidazoles is a disadvantage, for in many applications it is desired to avoid such high-energy light because of its adverse effect on other constituents, or it is desired to use instead less costly lower energy visible light. Moreover, in some imaging applications, it is desired to cover the biimidazole-leuco dye composition with a transparent film. Some film materials, such as "Mylar" and "Cronar" commercial polyesters are not transparent to wavelengths below 300 m$\mu$ and thus prevent a good portion of the ultraviolet range from reaching the biimdazole.

It is, therefore, an object of the present invention to extend the spectral sensitivity of the ultraviolet light-absorbing hexaarylbiimidazoles to longer wavelength visible light and thereby provide visible-light activated hexaarylbiimidazole compositions useful as light screens and photooxidants, as described in British Pat. 997,396; and to provide novel hexarylbiimidazole/leuco dye imaging compositions responsive to visible as well as ultraviolet light, useful as described in British Pat. 1,047,569.

SUMMARY OF THE INVENTION

This invention is directed to a visible-light sensitive composition comprising (A) a selected hexaarylbiimidazole which has its principle light absorption bands in the ultraviolet region of the electromagentic radiation spectrum and is dissociable to triarylimidazolyl radicals on being irradiated with absorbable ultraviolet light, and (B) at least one oxa-, thia, selena-, oxathia-, oxaselena, or thiaselena-carboxycanine dye having its principle light absorption bands in the visible region of the spectrum, present in an amount sufficient to transfer energy to the hexaarylbiimidazole.

The invention is also directed to a composition containing components (A) and (B) above and (C) a leuco dye oxidizable to the colored form by triarylimidazolyl radicals.

The invention is further directed to a method for sensitizing a hexaarylbiimidazole to visible light which comprises irradiating it with visible light in the presence of an energy transfer amount of a visible light-absorbing carbocyanine dye, said visible light having wavelengths corresponding to the visible-light absorption bands of the carbocyanine dye; and to a method of imagewise exposing a biimidazole/carbocyanine dye/leuco dye imaging composition as heretofore defined to a color-forming dosage of visible light.

The effect of the carbocyanine dye seems catalytic since only small amounts are normally required. The actual quantity employed depends on the particular biimidazole and the effect desired, but generally ranges from about 0.001 to 0.1 mole per mole of the biimidazoles (preferably .01–0.5 mole/mole). Smaller amounts may be used, but do not always give the desired effect, while larger amounts are often unnecessary. When the leuco dye is present, it is normally employed in amounts ranging from 0.1 to 10 moles per mole of biimidazole (preferably 0.5 to 2 mole/mole).

While the sensitization mechanism is not known with certainty, it is considered that when compositions of this invention comprising the biimidazole and the carbocyanine dye are irradiated with such relatively long wavelength light as visible light, the biimidazole is substantially unaffected and remains in its ground (unactivated) state. The carbocyanine dye, however, responding directly, absorbs the light and is activated to at least one excited energy transfer state. In such state, the activated dye transfers absorbed energy to the biimidazole, for example through collision or resonance interaction, and returns to the ground state, thus becoming available again for activation. The thus-indirectly-activated biimidazole dissocates into imidazolyl radicals.

The overall sensitization process can be represented as

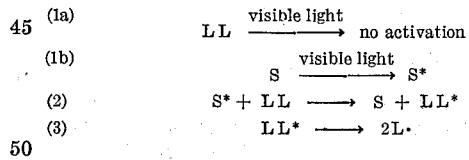

where S is the carbocyanine sensitizer, S* its activated energy transfer state; LL is the biimidazole (dimer), LL* its activated, dissociable state; L· is the resulting imidazoyly radical.

The subsequent fate of the inherently colored and energy-rich imidazolyl radicals and their utilization in accordance with the various embodiments of this invention depends on the absence or presence of other substances that are reactive towards the radicals. Thus, in formulating light screens or windows containing the biimidazole/carbocyanine sensitizer compositions of this invention, there will usually be employed other components, such as solvents, plasticizers and binders or carriers as described in said British Pat. 997,396 that are substantially inert, i.e., resistant, to oxidation by the imidazolyl radicals. In this embodiment, the sensitization process manifests itself as a color change, attributable to formation of the inherently colored triarylimidazolyl radical (Equation 3 above). When the light source is removed, the color fades as the radicals dimerize (Equation 4).

(4) $\quad 2L\cdot \rightarrow LL$

The imidazolyl radicals are useful oxidants in the compositions of the invention involving the leuco dyes, as schematically illustrated in Equation 5

(5) $\quad 2L\cdot + DH_2 \rightarrow 2LH + D$ where $DH_2$, for example, is an oxidizable substance such as a leuco dye, D is the oxidation product (dye), and LH is the reduction product (triarylimidazole). Thus the biimidazole/carbocyanine combinations are particularly useful as visible light actuated photooxidants for a variety of substrates, including leuco dyes, and the biimidazole/sensitizer/leuco dye combinations composition of this invention constitutes the basic ingredient of visible light actuated imaging systems. This latter composition can also include other components such as solvents, plasticizers, binders or carriers as described in said British Pat. 1,047,796 that are substantially inert to composition ingredients.

DETAILED DESCRIPTION OF THE INVENTION

(A) The carbocyanine dye component

The energy-transfer visible-light absorbing carbocyanine dyes utilized in the present invention are those which absorb light maximally in the 450–600 m$\mu$, preferably in the 500–600 m$\mu$, range, and which have the general structural formula:

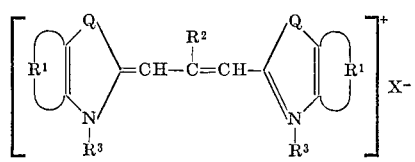

wherein each Q is oxygen, sulfur or selenium;

$R^1$ is a $C_4$–$C_{10}$ divalent conjugated hydrocarbylene group which together with the vicinal carbons to which it is attached completes a benzenoid ring;
$R^2$ is hydrogen or a $C_1$–$C_5$ alkyl group,
$R^3$ is a $C_1$–$C_5$ aliphatic hydrocarbyl group, and
$X^-$ is a salt-forming anion.

The carbocyanines may be symmetrical or unsymmetrical with respect to Q and thus may be simple oxa- (both Q's=O), thia- (both Q's=S) and selena (both Q's=Se) carbocyanines, or mixed oxathia- (one Q=O, the other S), oxaselena (one Q=O, the other Se) or thiaselena (one Q=S, the other Se) carbocyanines. The structures may also be symmetrical or unsymmetrical with respect to $R_1$ and $R_3$; that is, either one or both of these radicals in one ring may be the same as or different from these radicals in the other ring.

Divalent $R^1$ includes alkadienylene radicals such as

—CH=CH—CH=CH—,

—CH=C(CH$_3$)—CH=CH—,

CH—C(CH$_3$)—C(CH$_3$)=CH—, and

—CH=C(C$_2$H$_5$)—CH=CH—, and ortho-alkenylaryl analogs such as —C$_6$H$_4$—CH=CH—,

—C$_6$H$_3$(CH$_3$)—CH=CH—,

—C$_6$H$_2$(CH$_3$)$_2$—CH=CH— and

—C$_6$H$_4$—C(CH$_3$)=CH— wherein the free valences of the divalent radicals are 1,4 to each other. $R^2$ is preferably hydrogen but may be methyl, ethyl, propyl, butyl or amyl. $R^3$ is preferably alkyl, e.g. methyl, ethyl, propyl, butyl, or amyl, but may be unsaturated, e.g., allyl, crotyl, or propargyl. The anion, $X^-$, may vary widely, is usually halide, preferably bromide or iodide, but may be an inert conjugate base of a strong acid, for example, sulfate, sulfonate or phosphate.

Representative carbocyanines of this invention are:

3,3' - diethyl - 4,5,4',5'-dibenzoxacarbocyanine p-toluene sulfonate
3,3'-diethyl oxaselenacarbocyanine iodide
3,3'-di-n-butyl-9-methylthiacarbocyanine iodide
3,3'-diethyl thiaselenacarbocyanine iodide
3,3'-diethyl selenacarbocyanine iodide
3,3'-diethyl oxacarbocyanine iodide
3,3'-diethyl-9-methyl oxacarbocyanine iodide
3,3',9-trimethyl oxacarbocyanine iodide
3,3'-diethyl oxathiacarbocyanine iodide
3,3'-diethyl thiacarbocyanine iodide
3,3'-diallyl thiacarbocyanine bromide
3,3',9-trimethyl thiacarbocyanine iodide
3,3',9-triethyl thiacarbocyanine iodide
3,3'-diethyl-9-methylthiacarbocyanine iodide The first six are preferred.

It will be noted that the carbocyanines of this invention contain two azole (i.e. oxazole, thiazole or selenazole) rings as defined joined through a trimethine (i.e. =CH—C($R_2$)=CH—) bridge. Both features are important for effective biimidazole sensitization, particularly at long, i.e. 500 m$\mu$ and higher, wavelengths. In contrast analogous substances which contain two such rings joined by a simple methine (=CH—), as in the sample cyanines, or by a higher polymethine (=CH—(CH=CH)$_n$—)

as in the dicarbocyanines ($n$=2) and tricarbocyanines ($n$=3), are much less effective for this purpose. Also less effective are cyanines and carbocyanines wherein one or both of the azole rings has been replaced by a quinoline moiety.

The carbocyanine dyes of this invention characteristically absorb visible light maximumly in the 450–600 m$\mu$ range. Some also absorb substantially in the near ultraviolet and violet regions at wavelengths longer than absorption maxima of the biimidazoles, and are capable of transferring such relatively short wavelength light as well as the longer wavelength visible light to the biimidazoles.

(B) The hexaarylbiimidazole component

The hexaarylbiimidazoles are the 2,2',4,4',5,5'-hexaarylbiimidazoles that absorb ultraviolet light but little visible light, and are thereby dissociated into the corresponding 2,4,5-triarylbiimidazolyl radicals. The biimidazoles generally absorb maximally at absorption bands in the 250–275 m$\mu$ region, although the bands sometimes tail out to as low as 220 m$\mu$ and as high as 420 m$\mu$. They can be represented by the formula:

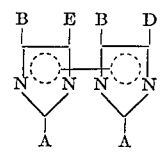

wherein A, B and D represent aryl groups which can be the same or different, carbocyclic or heterocyclic, unsubstituted or substituted with substituents that do not interfere with the dissociation of the biimidazole to the imidazolyl radical or with the oxidation of the leuco dye, and each dotted circle stands for four delocalized electrons (i.e., two conjugated double bonds) which satisfy the valences of the carbon and nitrogen atoms of the imidazolyl ring. The B and D aryl groups can be substituted with 0–3 substituents and the A aryl groups can be substituted with 0–4 substituents.

The aryl groups include one- and two-ring aryls, such as phenyl, biphenyl, naphthyl furyl and thienyl. Suitable inert substituents on the aryl groups have Hammett sigma (para) values in the −.5 to 0.8 and are free of Zerewitinoff hydrogen, i.e., have no hydrogens reactive towards methyl magnesium iodide. Representative substituents and their sigma values (relative to H=.00), as given by Jaffe, Chem. Rev. 53, 219–233 (1953) are: methyl (−0.17), ethyl (−0.15), t-butyl (−0.20), phenyl (0.22), trifluoromethyl (0.55), chloromethyl (0.18), cyanomethyl (0.01), 2-carboxyethyl (−0.07), butoxy (−0.32), phenoxy (−0.03), fluoro (0.06), chloro (0.23), bromo (0.23), iodo (0.28), methylthio (−0.05), methylsulfonyl (0.73), nitro (0.78), ethoxycarbonyl (0.52), and cyano (0.63). Thus, the substituents may be halogen, cyano, lower hydrocarbyl (including alkyl, halo alkyl, cyanoalkyl, and aryl), alkoxyl, aryloxy, alkylthio, arylthio, alkyl sulfonyl, arylsulfonyl, and nitro. In the foregoing list, alkyl groups referred to therein are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range −.4 to +.4, particularly lower alkyl, lower alkoxy, Cl, F and Br groups.

In a preferred biimidazole class, the 2 and 2′ aryl groups are phenyl rings bearing an ortho substituent having a Hammett sigma value in the range −.4 to +.4. Preferred such ortho substituents are fluorine, chlorine, bromine, lower alkyl and alkoxy groups; especially chloro.

Most preferably, the 2-phenyl ring carries only the above-described ortho group, and the 4- and 5-phenyl rings are either unsubstituted or substituted with lower alkoxy.

Representative hexaarylbiimidazoles which may be used in the practice of this invention are:

2,2′-bis(o-bromophenyl)-4,4′,5,5′-tetraphenylbiimidazole,
2,2′-bis(p-bromophenyl)-4,4′,5,5′-tetraphenylbiimidazole,
2,2′-bis(p-carboxyphenyl)-4,4′,5,5′-tetraphenylbiimidazole,
2,2′-bis(o-chlorophenyl)-4,4′,5,5′-tetrakis(p-methoxyphenyl)-biimidazole,
2,2′-bis(o-chlorophenyl)-4,4′,5,5′-tetraphenylbiimidazole,
2,2′-bis(p-chlorophenyl)-4,4′,5,5′-tetrakis(p-methoxyphenyl)-biimidazole,
2,2′-bis(p-cyanophenyl)-4,4′,5,5′-tetrakis(p-methoxyphenyl)-biimidazole,
2,2′-bis(2,4-dichlorophenyl)-4,4′,5,5′-tetraphenylbiimidazole,
2,2′-bis(2,4-dimethoxyphenyl)-4,4′,5,5′-tetraphenylbiimidazole,
2,2′-bis(o-ethoxyphenyl)-4,4′,5,5′-tetraphenylbiimidazole,
2,2′-bis(m-fluorophenyl)-4,4′,5,5′-tetraphenylbiimidazole,
2,2′-bis(o-fluorophenyl)-4,4′,5,5′-tetraphenylbiimidazole,
2,2′-bis(p-fluorophenyl)-4,4′,5,5′-tetraphenylbiimidazole,
2,2′-bis(o-hexoxyphenyl)-4,4′,5,5′-tetraphenylbiimidazole,
2,2′-bis(o-hexylphenyl)-4,4′,5,5′-tetrakis(p-methoxyphenyl)-biimidazole,
2,2′-bis(3,4-methylenedioxyphenyl)-4,4′,5,5′-tetraphenylbiimidazole,
2,2′-bis(o-chlorophenyl)-4,4′,5,5′-tetrakis(m-methoxyphenyl)biimidazole,
2,2′-bis(o-chlorophenyl)-4,4′,5,5′-tetrakis[m-(beta-phenoxyethoxyphenyl)biimidazole,
2,2′-bis(2,6-dichlorophenyl)-4,4′,5,5′-tetraphenylbiimidazole,
2,2′-bis(o-methoxyphenyl)-4,4′,5,5′-tetraphenylbiimidazole,
2,2′-bis(p-methoxyphenyl)-4,4′-bis(o-methoxyphenyl)-5,5′-diphenylbiimidazole,
2,2′-bis(o-nitrophenyl)-4,4′,5,5′-tetraphenylbiimidazole,
2,2′-bis(p-phenylsulfonylphenyl)-4,4′,5,5′-tetraphenylbiimidazole,
2,2′-bis(p-sulfamoylphenyl)4,4′,5,5′-tetraphenylbiimidazole,
2,2′-bis(2,4,6-trimethylphenyl)-4,4′,5,5′-tetraphenylbiimidazole,
2,2′-di-4-biphenyl-4,4′,5,5′-tetraphenylbiimidazole,
2,2′-di-1-naphthyl-4,4′,5,5′-tetrakis(p-methoxyphenyl)-biimidazole,
2,2′-di-9-phenanthryl-4,4′,5,5′-tetrakis(p-methoxyphenyl)biimidazole,
2,2′-diphenyl-4,4′,5,5′-tetra-4-biphenylylbiimidazole,
2,2′-diphenyl-4,4′,5,5′-tetra-2,4-xylylbiimidazole,
2,2′-di-3-pyridyl-4,4′,5,5′-tetraphenylbiimidazole,
2,2′-di-3-thienyl-4,4′,5,5′-tetraphenylbiimidazole,
2,2′-di-o-tolyl-4,4′,5,5′-tetraphenylbiimidazole,
2,2′-di-p-tolyl-4,4′-di-o-tolyl-5,5′-diphenylbiimidazole,
2,2′-di-2,4-xylyl-4,4′,5,5′-tetraphenylbiimidazole,
2,2′,4,4′,5,5′-hexakis(p-benzylthiophenyl)biimidazole,
2,2′,4,4′,5,5′-hexa-1-naphthylbiimidazole,
2,2′,4,4′,5,5′-hexaphenylbiimidazole,
2,2′-bis(2-nitro-5-methoxyphenyl)-4,4′,5,5′-tetraphenylbiimidazole, and
2,2′-bis(o-nitrophenyl)-4,4′,5,5′-tetrakis(m-methoxyphenyl)biimidazole.

The biimidazoles are conveniently obtained by known methods as more particularly described by British Pat. 997,396 and by Hayashi et al., Bull. Chem. Soc. Japan, 33, 565 (1960). The preferred method, involving oxidative dimerization of the corresponding triarylimidazole with ferricyanide in alkali, generally yields the 1,2′-biimidazoles, although other isomers, such as the 1,1′,1,4′, 2,2′,2,4′ and 4,4′-biimidazoles are sometimes also obtained admixed with the 1,2′-isomer. For the purposes of this invention, it is immaterial which isomer is employed so long as it is photodissociable to the imidazolyl radical as discussed above.

Biimidazoles useful in this invention are described in South African patent application 3627/63, published Aug. 12, 1963, and in British Pat. 997,396, published July 7, 1965.

(C) The leuco dye component

The leuco dye component together with the biimidazole and the carbocyanine forms one embodiment of this invention. By the term "leuco dye" is meant the colorless (i.e., the reduced) form of a dye compound which upon oxidation becomes colored. When present in the composition of this invention, it is oxidized to its colored form by the imidazolyl radical.

Leuco dyes which may be oxidized to color by triarylimidazolyl radicals generated by this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p′-biphenols, 2(p-hydroxyphenyl)-4,5-diphenylimidazoles, phenethylanilines, and the like.

The aminotriarylmethanes are preferred, especially those containing tertiary amino groups, and in particular those wherein (1) at least two aryls are phenyls having (a) a para-$R_1R_2N$ substituent, where $R_1$ and $R_2$ are $C_1$–$C_{10}$ alkyl, 2-hydroxyethyl, 2-cyanoethyl, benzyl or phenyl, and (b) an ortho $C_2$–$C_6$ alkyl, $C_1$–$C_6$ alkoxy, fluoro, chloro, or bromo-substituent and (2) the third aryl, when different from the first two, is thienyl, furyl, phenyl or phenyl substituted with one or more $C_1$–$C_6$ alkyl, $C_1$–$C_6$ alkoxy, methylenedioxy, fluoro, chloro, bromo, dialkylamino, alkylthio or benzylthio groups.

Representative aminotriarylmethanes that may be used in this invention follow:

bis(2-bromo-4-diethylaminophenyl)phenylmethane,
bis(2-butoxy-4-diethylaminophenyl)phenylmethane,
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane,
bis(4-dibutylamino-o-tolyl)2-thienylmethane,
bis(4-diethylamino-2-ethylphenyl)(3,4-methylenedioxyphenyl)methane,
bis(4-diethylamino-2-fluorophenyl)(p-benzylthiophenyl)methane,
bis(4-diethylamino-2-fluorophenyl)(3,4-methylenedioxyphenyl)methane,
bis(4-diethylamino-2-methoxyphenyl)(p-nitrophenyl)methane,
bis(4-diethylamino-1-naphthyl)(4-diethylamino-o-tolyl)methane,
bis(4-diethylamino-o-tolyl)(2,4-dimethoxyphenyl)methane,
bsi(4-diethylamino-o-tolyl)(2,4-dimethoxyphenyl)methane,
bis(4-diethylamino-o-tolyl)2-furylmethane,
bis(4-diethylamino-o-tolyl)(p-methoxyphenyl)methane,
bis(4-diethylamino-o-tolyl)3,4-methylenedioxyphenyl)methane,
bis(4-diethylamino-o-tolyl)(p-methylthiophenyl)methane,
bis(4-diethylamino-o-tolyl)-1-naphthylmethane,
bis(4-diethylamino-o-tolyl)phenylmethane,
bis(4-diethylamino-o-tolyl)2-thienylmethane,
tris(4-dimethylamino-2-chlorophenyl)methane,
bis(4-dimethylamino-2,5-dimethylphenyl)phenylmethane,
bis(4-dimethylamino-2-hexylphenyl)(p-butylthiophenyl)methane,
bis(4-dimethylamino-o-tolyl)(o-bromophenyl)methane,
bis[4-(N-ethylanilino)-o-tolyl](3,4-dibutoxyphenyl)-methane,
bis(4-ethylbenzylamino-o-tolyl)(p-methoxyphenyl)-methane,
bis[4-bis(2-hydroxyethyl)amino-2-fluorophenyl]-(p-benzylthiophenyl)methane,
tris(4-diethylamino-o-tolyl)methane, and
tris(p-dioctylamino-o-tolyl)methane.

These amino substituted cationic dye precursors are generally employed in the color forming process as salts of strong acids, including Lewis acids, such as hydrochloric, hydrobromic, sulfuric, nitric, phosphoric, acetic, oxalic, p-toluenesulfonic, zinc chloride, zinc bromide, and ferric chloride, the proportion of acid varying from 0.33 mole to one mole per amino group.

These leuco dyes are described more fully in said British Pat. 1,047,569.

As mentioned previously, the compositions of this invention can and usually do contain inert solvents, plasticizers, binders, substrates and the like (0.5% by weight or more of each based on the total composition weight).

The compositions of this invention are prepared simply by mixing them together, usually in a solvent and/or binder. The solution can then be applied to a substrate in usual fashion, e.g., spray, brush, roller, dipping, and the like.

Suitable solvents are those inert to the other ingredients of the composition and include amides such as N,N-dimethylformamide, N,N - dimethylacetamide; alcohols such as methanol, ethanol, 1-propanol, 2-propanol, butanol, ethylene glycol; ketones such as acetone, methyl ethyl ketone, 3-pentanone; halocarbons such as methylene chloride, chloroform, 1,1,2-trichloroethane, and 1,1,2,2-tetrachloroethane; polyethylene glycols; esters, e.g., ethyl acetate and ethyl benzoate; aryls such as benzene, o-dichlorobenzene and toluene; dimethylsulfoxide, pyridine, acetonitrile, tetrahydrofuran, dioxane, 1,1,2 - trichloro ethylene, 1-methyl-2-oxohexamethyleneimine, and mixtures thereof.

Suitable inert plasticizers include the polyethyleneglycols, such as the commercially available carbowaxes, and related materials, such as substituted phenol-ethylene oxide adducts, for example the products obtained from p-phenylphenol and 6 moles ethylene oxide, and from p-nonylphenol and 2 moles ethylene oxide, including commercially available materials such as the Igepal alkyl phenoxy polyoxyethylene ethanols.

Polymeric materials, particularly light-transparent and film-forming polymers, are useful as inert binders, and carriers for the essential ingredients described above; thus, bi-imidazole, leuco dye, sensitizer and polymer, with or without a mutual solvent, may be mixed, then sprayed, extruded, cast, pressed or otherwise formed into supported or unsupported films or shaped articles. Representative polymers are polyvinyl alcohol, ethyl cellulose, polyvinyl chloride, polystyrene, polyvinyl acetate, poly-(methyl methacrylate), cellulose acetate, cellulose butyrate, copolymers of vinyl monomers, gelatin, and polyethylene. Other suitable inert materials which may be used include glasses, resins, and waxes.

Typical inert substrates include materials commonly used in the graphic arts and in decorative applications, such as paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polyvinylchloride; textile fabrics; glass; wood and metals.

Any convenient light source providing wavelengths in the visible region of the spectrum that overlap the sensitizing dyes absorption bands may be used to activate the light-sensitive compositions for imidazolyl radical and image formation. The light may come from natural or artificial sources, may be monochromatic or polychromatic, incoherent or coherent, and for high efficiency should correspond closely in wavelengths to the principal absorption bands of the sensitizing dye employed and should be sufficiently intense to activate a substantial proportion of the sensitizer. Also, it may often be advantageous to employ visible light in conjunction with ultraviolet light normally required to dissociate the dimer to increase the speed of imidazolyl radical and image formation.

(D) Examples

Representative examples further illustrating the invention follow, and are not meant to be limiting:

Examples 1–4

Visible-light sensitive compositions of this invention containing the following ingredients were prepared as solutions in acetone, a convenient carrier solvent:

| Component | Molarity | Relative mole ratio o-ClHABI=1 |
|---|---|---|
| 2,2'-bis(o-chlorophenyl)-4,4',5,5'-tetraphenyl biimidazole (o-ClHABI) | $3 \times 10^{-2}$ | 1.0 |
| tris(N,N-diethylamino-o-tolyl)methane | $1.5 \times 10^{-2}$ | 0.5 |
| p-toluene sulfonic acid | $3 \times 10^{-2}$ | 1.0 |
| Carbocyanine dye as tabulated below | $4 \times 10^{-4}$ | 0.0133 |

Control solutions without biimidazole or sensitizer were also prepared for comparison.

For testing, each solution was mixed with 6.8% by weight of a polyethylene ether having an average molecular weight of about 550 as a binder, and spotted on 1" x 3" strips of Whatman No. 1 filter paper. After the acetone had evaporated, the papers were irradiated, by contact flashing with a Xenon flash lamp (HiCo Lite, emitting ultraviolet and visible light about 200 mµ and approximating ordinary sun light), directly and through a series of sharp cut-off filters, as designated below, which transmit wavelengths longer than that specified but substantially no shorter wavelengths.

| Filter | Available as Corning Filter No./Glass No. | Cut-off wavelength, mµ |
|---|---|---|
| 1 | 3-71/3385 | 470 |
| 2 | 3-69/3486 | 520 |
| 3 | 3-66/3480 | 560 |
| 4 | 2-62/2418 | 609 |

This test demonstrates biimidazole photolysis to triarylimidazolyl radicals through reaction of the radicals with a triarylmethane leuco dye, evidenced by formation of the triarylmethane dye's characteristic blue color.

The results are tabulated below:

VISIBLE-LIGHT SENSITIZED BIIMIDAZOLE PHOTOLYSIS

| Example | Carbocyanine (a) | Filter/Color formation (d) | | | |
|---|---|---|---|---|---|
| | | 1, 470 mµ→ | 2, 520→ | 3, 560→ | 4, 600→ |
| 1 | 3,3'-diethyl oxa | + | — | — | — |
| 2 | 3,3'-diethyl-9-methyl oxa | + | + | — | — |
| 3 | 3,3'-9-trimethyl oxa | + | + | — | — |
| 4 | 3,3'-diethyl,4,5,4',5'-dibenzo oxa | + | + | + | — |
| 5 | 3,3'-diethyl oxathia | + | + | — | — |
| 6 | 3,3'-diethyl oxaselena | + | + | + | — |
| 7 | 3,3'-diethyl thia | + | + | — | — |
| 8 | 3,3'-diallyl thia | + | + | + | — |
| 9 | 3,3'-9-trimethyl thia | + | + | + | — |
| 10 | 3,3'9-triethyl thia | + | + | + | — |
| 11 | 3,3'-diethyl-9-methyl thia | + | + | + | — |
| 12 | 3,3'-di-n-butyl-9-methyl thia | + | + | + | + |
| 13 | 3,3'-diethyl thiaselena | + | + | + | + |
| 14 | 3,3'-diethyl selena | + | + | + | + |
| Control: | | | | | |
| 1 | Biimidazole/no carbocyanine | —(c) | — | — | — |
| 2 | No biimidazole/no carbocyanine | — | — | — | — |
| 3 | Carbocyanine(b)/no biimidazole | — | — | — | — |

NOTES:
(a) All as the iodide except Examples 4 (p-tosylate) and 8 (bromide).
(b) All carbocyanines 1–14.
(c) Unfiltered light (300 mµ→) produced color; but no color without the biimidazole.
(d) +=color; —=no color.

These results show (1) the biimidazole photooxidant in the absence of sensitizer requires relatively short wavelength light for its activation, (2) the sensitizer extends the spectral sensitivity of the biimidazole towards longer wavelength light, permitting it to effectively utilize bluer light for activation.

In contrast, analagous cyanines, carbocyanines, dicarbocyanines and tricarbocyanines, as listed below, outside the scope of this invention, either (a) did not sensitize color formation when the compositions were irradiated with filtered light as described above or (b) exhibited only a limited sensitizing action in that they required light having wavelengths below about 500 mµ for sensitization:

1,1'-diethyl-2,2-cyanine iodide
1,1'-diethyl-4,4'-cyanine iodide
1,1'-diethyl-2,4'-cyanine iodide
1,1'-diisoamyl-4,4'-cyanine iodide
1,1',6-trimethyl-2,4'cyanine iodide
1,1'-diethyl-4,4'carbocyanine iodide
1,1'-diethyl-2,2'-carbocyanine iodide
1,1'-diethyl-2,2'-carbocyanine bromide
1,1'-diethyl-2,4'-carbocyanine iodide
1,1'-diethyl-4,4'-tricarbocyanine iodide
1,3'-diethyl thiacyanine iodide
1,3'-diethyl-4,2'-quinolyl selenacyanine iodide
1,3'-diethyl-4,2'-quinolyl oxacyanine iodide
1,3'-diethyl-2,2'-quinolyl oxacarbocyanine iodide
1,3'-diethyl-2,2'-quinolyl thiacarbocyanine iodide
3,3'-diethyl thiacyanine iodide
3,3'-diethyl selenacyanine iodide
3,4'-diethyl thiadicarbocyanine iodide
3,3'-diethyl thiatricarbocyanine iodide Also, as sensitizers of biimidazole photolysis for the purpose of this invention, the subject carbocyanines as a class have been found superior to hemicyanines such as:

2-(p-dimethylaminostyryl)-pyridyl methyl iodide
2-(p-dimethylaminostyryl)-pyridyl ethyl iodide
2-(p-diethylaminostyryl)-pyridyl ethyl iodide
2,4-bis-(p-dimethylaminostyryl)-pyridyl ethyl iodide
2-(p-dimethylaminostyryl)-quinolyl ethyl p-tosylate
6-ethoxy-2-(m-nitrostyryl)-quinolyl methyl chloride
2-(p-dimethylaminostyryl)-4-methylthiazolyl methyl iodide
2-(p-diethylaminostyryl)-benzthiazolyl methyl iodide
2-(p-dimethylaminostyryl)-4-methoxazolyl methyl iodide
2-(p-dimethylaminostyryl)-6-dimethylaminoquinolyl ethyl iodide.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A visible-light-sensistive composition comprising:
   (A) a 2,2',4,4',5,5' - hexaarylbiimidazole wherein each aryl group contains 6–14 carbon atoms; the 4,4',5 and 5' aryl groups contain 0–3 substituents that are free of hydrogen capable of reacting with methyl magnesium iodide and have a sigma value between —.5 and +0.8; the 2 and 2' aryl groups contain 0–4 substituents that are free of hydrogen capable of reacting with methyl magnesium iodide and have a sigma value between —.5 and +0.8; and
   (B) at least one carbocyanine dye of the general structural formula:

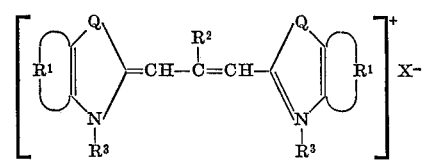

wherein each Q is oxygen, sulfur or selenium; $R^1$ is a $C_4$–$C_{10}$ divalent conjugated hydrocarbylene group which together with the vicinal carbons to which it is attached completes a benzenoid ring; $R^2$ is hydrogen, or $C_1$–$C_5$ alkyl group; $R^3$ is a $C_1$–$C_5$ aliphatic hydrocarbyl group; and $X^-$ is a salt-forming anion; present in an amount sufficient to transfer energy to the biimidazole.

2. The composition of claim 1 which contains additionally
(C) the leuco form of a dye that is oxidizable to the colored form.

3. The composition of claim 1 wherein in component (A) the aryl groups are phenyl and the substituents are lower alkyl, lower alkoxy, chlorine, fluorine or bromine, and wherein in component (B) $R^1$ is

—CH=CH—CH=CH—

$R^2$ is hydrogen; and each $R^3$ is alkyl of 1–5 carbons.

4. The composition of claim 1 wherein component (A) is 2,2'-bis(o-chlorophenyl) - 4,4',5,5' - tetraphenylbiimidazole, and component (B) is selected from the class consisting of:

3,3'-diethyl-4,5,4',5'-dibenzoxacarbocyanine p-toluene sulfonate,
3,3'-diethyl oxaselenacarbocyanine iodide,
3,3'-di-n-butyl-9-methylthiacarbocyanine iodide,
3,3'-diethyl thiaselenacarbocyanine iodide,
3,3'-diethyl selenacarbocyanine iodide, and
3,3'-diethyl oxacarbocyanine iodide.

5. The composition of claim 1 wherein component (A) is 2,2' - bis(o - chlorophenyl) - 4,4',5,5' - tetrakis(m-methoxyphenyl)biimidazole, and component (B) is selected from the class consisting of:

3,3'-diethyl-4,5,4',5'-dibenzoxacarbocyanine p-toluene sulfonate,
3,3'-diethyl oxaselenacarbocyanine iodide,
3,3'-di-n-butyl-9-methylthiacarbocyanine iodide,
3,3'-diethyl thiaselenacarbocyanine iodide,
3,3'-diethyl selenacarbocyanine iodide, and
3,3'-diethyl oxacarbocyanine iodide.

6. The composition of claim 3 which contains additionally:
(C) the leuco form of the acid salt of an aminotriarylmethane dye that is oxidizable to the colored form.

7. The composition of claim 6 wherein in component (A) the 2 and 2' phenyl groups are each o-chlorophenyl.

8. The composition of claim 7 wherein component (C) is the acid salt of an aminodiphenylarylmethane dye in which the two phenyl groups have (1) an $R^1R^2N$ group in the para position wherein $R^1$ and $R^2$ are each $C_1$–$C_{10}$ alkyl, 2-hydroxyethyl, 2-cyanoethyl, benzyl or phenyl, and have (2) a substituent ortho to the carbon attached to the methane carbon, selected from lower alkyl, lower alkoxy, fluoro, chloro or bromo; and the aryl group is thienyl, furyl, phenyl or phenyl substituted with lower alkyl, lower alkoxy, methylenedioxy, fluoro, chloro, bromo, diethylamino, lower alkylthio or benzylthio.

9. The composition of claim 5 wherein in the aminotriarylmethane, the two phenyl groups substituted with $R^1R^2N$ are each p-diloweralkylamino-o-tolyl.

10. The composition of claim 4 which contains additionally:
(C) the p-toluene sulfonic acid salt of tris(N,N-diethylamino-o-tolyl)methane.

11. The composition of claim 5 which contains additionally:
(C) the p-toluene sulfonic acid salt of tris(N,N-diethylamino-o-tolyl)methane.

12. A coating composition comprising a composition of claim 6 in an inert solvent.

13. A coated composition comprising an inert substrate coated with a composition of claim 6.

14. The coated composition of claim 13 wherein the substrate is paper.

15. The coated composition of claim 13 wherein the substrate is a film.

16. Process which comprises irradiating a composition of claim 1 with visible light in a color-forming dosage.

17. Process which comprises irradiating a composition of claim 2 with visible light in a color-forming dosage.

18. Process which comprises irradiating a composition of claim 13 with visible light in a color-forming dosage.

19. The composition of claim 2 wherein component (C) is seletced from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, a leuco indamine, an aminohydrocinnamic acid, a hydrazine, a leuco indigoid dye, an amino - 2,3 - dihydroanthraquinone, a tetrahalo - p,p' - biphenol, a 2(p - hydroxyphenyl) - 4,5 - diphenylimidazole, and a phenethylaniline.

References Cited
UNITED STATES PATENTS 3,099,558  7/1963  Levenos _____ 96—36.3X
3,390,996  7/1968  MacLachlan _____ 96—90

NORMAN G. TORCHIN, Primary Examiner

R. E. FICHTER, Assistant Examiner